US006219224B1

(12) United States Patent
Honda

(10) Patent No.: US 6,219,224 B1
(45) Date of Patent: Apr. 17, 2001

(54) SOLID ELECTROLYTIC CAPACITOR

(75) Inventor: Nobuhiro Honda, Saga (JP)

(73) Assignees: Sanyo Electric Co., Ltd., Moriguchi; Saga Sanyo Industries Co., Ltd., Kishima-gun, both of (JP)

( * ) Notice: Subject to any disclaimer, the term of this patent is extended or adjusted under 35 U.S.C. 154(b) by 0 days.

(21) Appl. No.: 09/468,296

(22) Filed: Dec. 21, 1999

(30) Foreign Application Priority Data

Dec. 21, 1998 (JP) .................................................. 10-362510

(51) Int. Cl.[7] ................................ H01G 9/10; H05K 5/06
(52) U.S. Cl. .......................... 361/537; 361/536; 361/518; 361/519
(58) Field of Search ................................ 361/523, 524, 361/525, 526, 527, 528, 529, 530, 531, 532, 533, 534, 535, 536, 537, 538, 539, 540, 541, 517–519; 174/50.56, 50.61

(56) References Cited

U.S. PATENT DOCUMENTS

| 3,255,387 | * | 6/1966 | Giacomello | 361/538 |
| 3,439,231 | * | 4/1969 | Booe | 361/536 |
| 4,538,212 | * | 8/1985 | Montgomery | 361/536 |
| 5,798,906 | * | 8/1998 | Ando et al. | 361/520 |
| 6,052,273 | * | 4/2000 | Inoue et al. | 361/523 |

FOREIGN PATENT DOCUMENTS

| 0 704 871 A1 | 4/1996 | (EP) . |
| 0 872 859 A2 | 10/1998 | (EP) . |

* cited by examiner

*Primary Examiner*—Dean A Reichard
*Assistant Examiner*—Eric Thomas
(74) *Attorney, Agent, or Firm*—Armstrong, Westerman, Hattori, McLeland & Naughton, LLP

(57) ABSTRACT

The invention provides a solid electrolytic capacitor including a bottomed tubular case 4, a capacitor element 1 enclosed in the case 4, and a hermetic seal structure 7 sealing off an opening of the case 4. The opening of the case 4 is closed with a disklike seal plate 71 having a pair of through holes 76, 76. A pair of pipe members 73, 73 are inserted through the respective holes 76, 76 of the seal plate 71. Each of the pipe members 73 includes a ceramic pipe piece 74, and a gold thin film 75 formed at least over the inner periphery of the pipe piece 74. A clearance in each hole 76 of the seal plate 71 is filled with a glass material 72. A pair of lead pins 13, 13 extending from the capacitor element 1 extend through center bores of the pipe members 73, 73, respectively. A clearance in each pipe member 73 is filled with a brazing metal material 33.

6 Claims, 4 Drawing Sheets

SOLID ELECTROLYTIC CAPACITOR

FIELD OF THE INVENTION

The present invention relates to solid electrolytic capacitors, and more particularly to hermetic seal structures for use in solid electrolytic capacitors comprising a capacitor element impregnated with a solid electrolyte, and a case having the capacitor element enclosed therein and hermetically sealed off.

BACKGROUND OF THE INVENTION

JP-B No. 51489/1987, JP-B No. 51491/1987, JP-B No. 66373/1992, U.S. Pat. No. 4,580,855, etc. disclose solid electrolytic capacitors which comprise a capacitor element including a metal member and impregnated with a TCNQ complex salt as an electrolyte, the metal member acting as a valve and being formed with a chemical conversion coating. "TCNQ" stands for 7,7,8,8-tetracyanoquinodimethane.

FIG. 5 shows one type of solid electrolytic capacitor which is already known and has a bottomed tubular aluminum case 40 accommodating a capacitor element 1 therein, filled with an epoxy resin 9 and having its opening sealed off. The capacitor element 1 comprises an anode foil which is an etched aluminum foil formed with a chemical conversion coating, and a cathode foil opposed to and superposed on the anode foil with a separator interposed therebetween. The capacitor element 1 is prepared by winding up the assembly of the foils and separator into a roll, and impregnating the roll with a solid electrolyte such as a TCNQ complex salt. A pair of lead terminals 12, 12 extend from the anode foil and the cathode foil, and lead pins 13, 13 extend from the respective terminals.

The solid electrolytic capacitor described is fabricated by filling a suitable amount of powder of TCNQ complex salt into a case 40 first, heating the case at 250 to 350° C. to melt the salt into a liquid, immersing the roll into the molten salt to impregnate the roll with the salt, thereafter rapidly cooling the roll as placed in the case to solidify the salt and finally filling an epoxy resin 9 into the case 40.

The prior-art solid electrolytic capacitor described has the problem of impaired reliability involving variations in capacitance and increases in equivalent series resistance (ESR) due to the degradation of the sealing epoxy resin in a high-temperature environment or the penetration of moisture through the portion of contact between the sealing epoxy resin and the case or through the portion of contact between the sealing epoxy resin and the lead pin.

Accordingly, the present applicant has proposed in JP-A No. 3840/1999 a solid electrolytic capacitor having a hermetic seal structure and shown in FIG. 6. The proposed capacitor comprises a capacitor element 1 impregnated with a solid electrolyte and a bottomed tubular metal case 4 enclosing the capacitor element 1 therein, the capacitor element 1 comprising an anode foil formed with a chemical conversion coating, a cathode foil opposed to the anode foil and a separator interposed between the foils, and prepared by winding up the assembly of these components into a roll. The case 4 has an opening which is closed with the hermetic seal structure 6 to be described below.

The opening of the case 4 is closed with a disklike seal plate 61 made of metal and having a pair of through holes. A pair of metal pipe pieces 63, 63 each having a center bore are inserted through the respective holes of the seal plate 61 without contacting the inner peripheries of the plate 61 defining the holes. A glass material 62 is filled in a clearance in each through hole around the pipe piece 63 to provide electrical insulation and to seal off the clearance. The pipe pieces 63 are made of Cu, CuZn alloy or the like.

A pair of lead pins 13, 13 extending from the capacitor element 1 extend through the respective center bores of the pipe pieces 63, 63 without contacting the inner peripheries of the pipe pieces defining the bores. Solder or like brazing metal material 33 is filled in a clearance in each pipe piece 63 around the lead pin 13 to seal off the clearance. The edge portion of the case 4 defining its opening is joined to the outer peripheral edge portion of the seal plate 61 by resistance welding.

The hermetic seal structure 6 described gives high airtightness to the case 4, therefore renders the capacitor element 1 free of the influence of moisture and assures the capacitor of high reliability over a prolonged period of time.

However, the pipe piece 63 which is made of Cu, CuZn alloy or the like differs greatly from the glass material 62 provided around the pipe piece 63 in coefficient of thermal expansion, so that when the pipe piece 63 is heated to seal off the clearance therein with the brazing metal material 33, the glass material 62 is likely to separate from the pipe piece 63 at the joint therebetween or to develop cracks in the vicinity of the outer periphery of the pipe piece, consequently impairing the sealing effect.

SUMMARY OF THE INVENTION

An object of the present invention is to provide a solid electrolytic capacitor having a hermetic seal structure which is unlikely to become impaired in its sealing properties even if exposed to heat in the assembling process thereof.

The present invention provides a solid electrolytic capacitor comprising a tubular metal case having an opening at at least one end thereof, and a capacitor element enclosed in the case and having an anode member formed with a chemical conversion coating, the capacitor element being impregnated with a solid electrolyte and having at least one lead pin extending therefrom, the opening of the case being closed with a hermetic seal structure.

The hermetic seal structure comprises:

a metal seal plate 71 having at least one through hole 76 and provided on the case 4 to close the opening thereof, the seal plate 71 having an outer peripheral edge portion joined to an edge portion of the case 4 defining the opening, a pipe member 73 attached to the seal plate 71 and inserted through the hole 76 thereof, the pipe member 73 having a center bore with the lead pin 13 extending therethrough, a glass material 72 filling a clearance in the through hole 76 of the seal plate 71 around the pipe member 73, and a brazing metal material 33 filling a clearance in the pipe member 73 around the lead pin 13, the pipe member 73 comprising a ceramic pipe piece 74, and a metal thin film 75 formed on the pipe piece 74 at least at a portion thereof joined to the brazing metal material 33.

Even if the pipe member 73 is heated to seal off the clearance therein with the brazing metal material 33, the glass material 72 is unlikely to separate from the pipe member 73 at the joint therebetween or to develop cracks in the vicinity of the outer periphery of the pipe member 73 because of a small difference in coefficient of thermal expansion between the ceramic pipe piece 74 which is a major portion of the pipe member 73 in volume and the glass material 72 provided externally thereof. Consequently, the hermetic seal structure assures the capacitor of high sealing properties.

Preferably, the pipe piece 74 and the metal thin film 75 of the pipe member 73 are each made from a nonmagnetic material.

Further preferably, the glass material 72 is a glass containing PbO and $B_2O_3$, or a glass containing Zn and $B_2O_3$, and the pipe piece 74 of the pipe member 73 is made from a ceramic containing alumina.

DETAILED DESCRIPTION OF EMBODIMENTS

Embodiments of the invention will be described below in detail with reference to the drawings.

Figure 1:
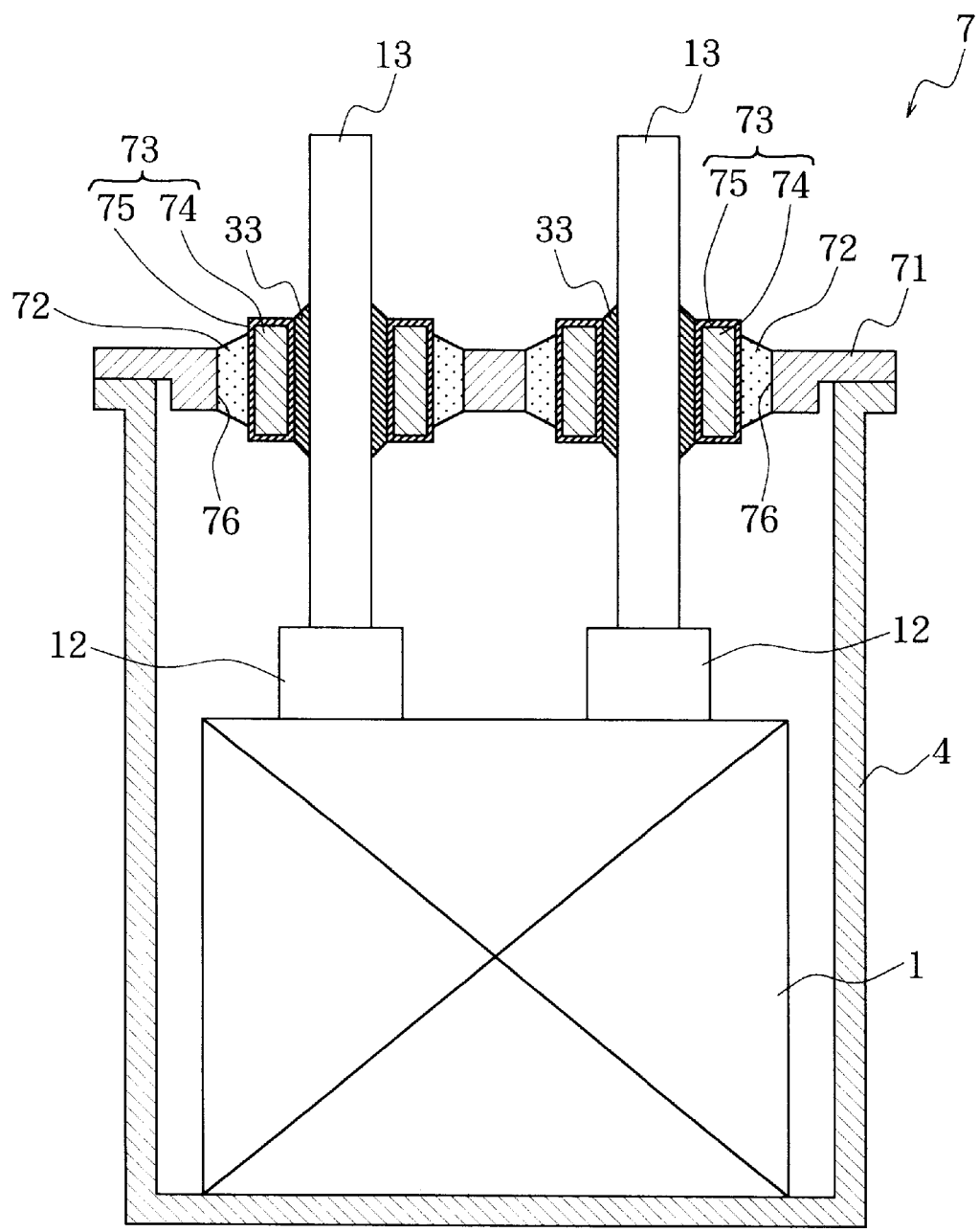
FIG. 1 is a view in section of a solid electrolytic capacitor embodying the invention.

FIG. 1 shows a solid electrolytic capacitor of the invention which comprises a bottomed tubular steel case 4 plated with nickel, and a capacitor element 1 enclosed in the case 4. The case 4 has an opening portion which is sealed off by a hermetic seal structure 7.

The capacitor element 1 comprises an aluminum anode foil formed with a chemical conversion coating, a cathode foil opposed to the anode foil, and a separator interposed between the foils, and is prepared by winding up the assembly of these components into a roll. The capacitor element 1 is impregnated with a solid electrolyte comprising a TCNQ complex salt, such as N-n-butylisoquinolinium $TCNQ_2$.

The hermetic seal structure 7 comprises a disklike seal plate 71 having a pair of through holes 76, 76 and closing the opening portion of the case 4. The seal plate 71 is made from a CoFeNi alloy and plated with gold over the surface. A pair of metal pipe members 73, 73 each having a center bore are inserted through the respective holes 76, 76 of the seal plate 71 without contacting the inner peripheries of the plate defining the holes.

Figure 2:
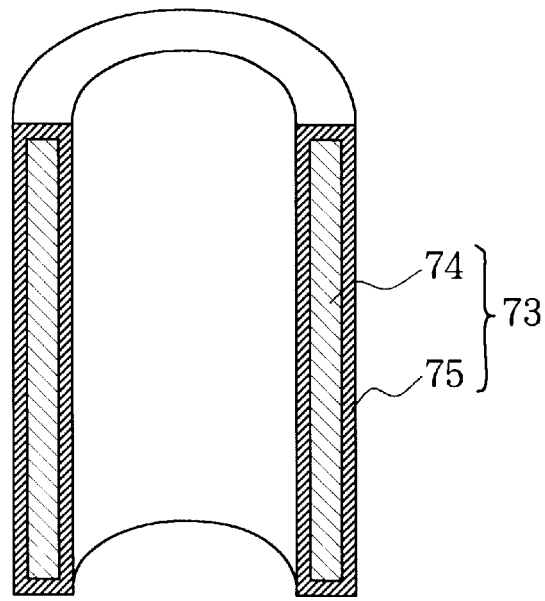
FIG. 2 is an enlarged view in section of a pipe member for use in the capacitor.

With reference to FIG. 2, each pipe member 73 comprises a ceramic pipe piece 74 covered over the entire surface thereof with a thin film 75 of a nonmagnetic metal such as gold. The pipe piece 74 is, for example, 0.8 mm in inside diameter, 1.3 mm in outside diameter and 1.7 mm in height. The metal thin film 75 is, for example, 0.03 $\mu$m in thickness. The metal thin film 75 can be formed, for example, by electroless plating.

As shown in FIG. 1, a clearance in each through hole 76 of the seal plate 71 around the pipe member 73 is filled with a glass material 72 to provide electrical insulation and a seal.

A pair of lead pins 13, 13 extending from the capacitor element 1 extend through the respective center bores of the pipe members 73, 73 without contacting the inner peripheries of the pipe members defining the bores. Solder or like brazing metal material 33 is filled in a clearance in each pipe member 73 around the lead pin 13 to seal off the clearance. The edge portion of the case 4 defining its opening is joined to the outer peripheral edge portion of the seal plate 71 by resistance welding. Incidentally, the inner periphery of the pipe member 73 may be locally in contact with the outer periphery of the lead pin 13.

The capacitor element 1 is prepared by filling a suitable amount of powder of a TCNQ complex salt into a bottomed tubular aluminum container first, heating the container at 250 to 350° C. to melt the salt into a liquid, immersing a roll for providing the capacitor element into the molten salt to impregnate the roll with the salt, and thereafter cooling the roll as withdrawn from the container to solidify the TCNQ complex salt impregnating the roll.

In assembling the solid electrolytic capacitor, pipe members 73, 73 are inserted through respective holes 76, 76 of a seal plate 71, and a molten glass serving as the glass material 72 is poured into each clearance in the hole 76 around the pipe member 73 to provide a seal.

Subsequently the capacitor element 1 is placed into a case 4, a pair of lead pins 13, 13 extending from the capacitor element 1 are inserted through the respective center bores of the pipe members 73, 73, the outer peripheral edge portion of the seal plate 71 is joined to the opening-defining edge portion of the case 4 by resistance welding, and solder or like brazing metal material 33 is filled into the clearance in each pipe member 73 for sealing. Since the pipe member 73 has a metal thin film 75 formed over the surface, the brazing metal material 33 effectively bondable to the pipe member 73.

The material suitable for the pipe piece 74 of the pipe member 73 is a nonmagnetic material having a coefficient of thermal expansion approximate to that of the glass material 72 to be provided externally thereof, such as a ceramic containing about 90% of alumina. The pipe piece 74 and the metal thin film 75 thus each prepared from a nonmagnetic material diminish the effective reactance of the lead pin 13, resulting in lower equivalent series resistance ESR or reduced impedance Z and giving improved electric characteristics to the capacitor.

Useful as the glass material 72 is a soft glass, such as PbO—$B_2O_3$ or ZnO—$B_2O_3$ glass, having a coefficient of thermal expansion of $4 \times 10^{-6}$/° C. to $10 \times 10^{-6}$/° C.

Even if the pipe member 73 is heated to seal off the clearance therein with the brazing metal material 33 in assembling the solid electrolytic capacitor of the invention described, it is unlikely that the pipe member 73 will separate from the glass material 72 at the joint therebetween or there is no possibility of the glass material 72 developing cracks in the vicinity of the outer periphery of the pipe member 73 because of a small difference in coefficient of thermal expansion between the glass material 72 and the ceramic pipe piece 74 which is a major portion of the pipe member 73 in volume, consequently ensuring a high sealing effect.

The capacitor of the present invention wherein no epoxy resin is used as a sealing material unlike the conventional capacitor is free of the conventional problem of the permeation of moisture due to the degradation of epoxy resin or the penetration of moisture through the joint between epoxy resin and the case or through the portion of contact between epoxy resin and the lead pin. The solid electrolyte impregnating the encased capacitor element is in contact with no epoxy resin and therefore remains free of degradation even if the capacitor is used in a deteriorating environment, assuring the capacitor of reliability.

Figure 6:
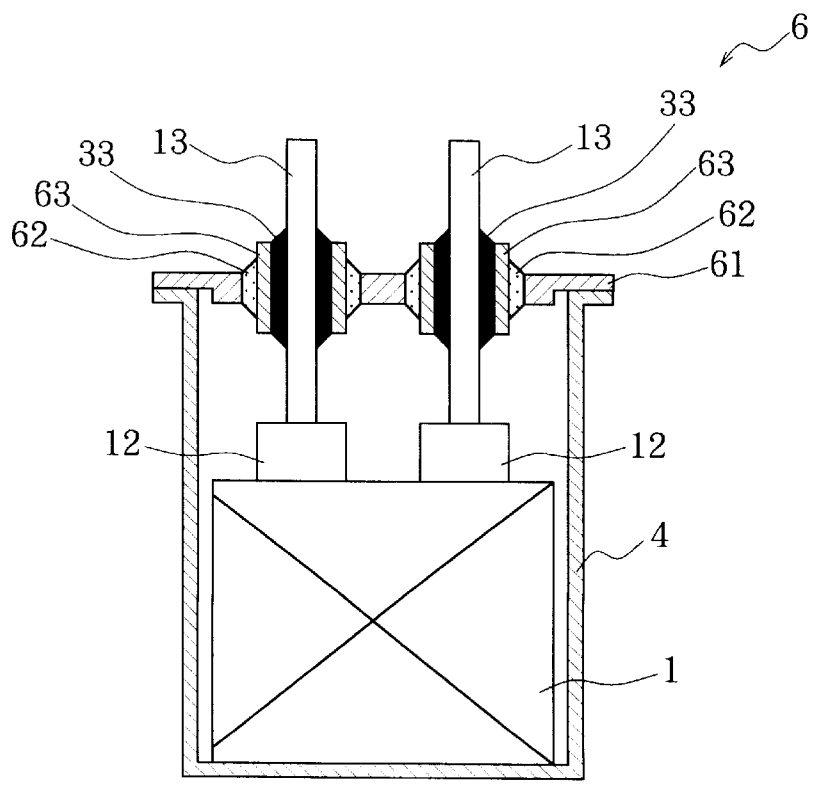
FIG. 6 is a view in section of another conventional solid electrolytic capacitor.

To substantiate the performance of the solid electrolytic capacitor of the present invention, the capacitor of the invention shown in FIG. 1(invention) and the conventional solid electrolytic capacitor shown in FIG. 6 (prior art) were subjected to the bubble leak test and reliability tests to be described below.

Table 1 shows the coefficients of thermal expansion (listed as "C.T.Exp." in Table 1) of the pipe pieces and glass materials used for the solid electrolytic capacitors of the invention and prior art.

TABLE 1

|  | MATERIAL OF PIPE PIECE | C.T.Exp. $(10^{-6}/°C.)$ PIPE PIECE | C.T.Exp. $(10^{-6}/°C.)$ GLASS | CO-EFFICIENT DIFFER-ENCE $(10^{-6}/°C.)$ |
|---|---|---|---|---|
| INVENTION | 92% ALUMINA-CONTAINING CERAMIC | 7.7 | 9.5 | 1.8 |
| PRIOR ART | Cu | 16.5 | 9.5 | 7.0 |

A. Bubble Leak Test

The solid electrolytic capacitor as completed was immersed in water to check the capacitor for the release of bubbles. The specimen releasing bubbles was evaluated as being faulty. Table 2 shows the test result achieved by 100 specimens of each of the capacitors of the invention and the prior art.

TABLE 2

| | INCIDENCE OF FAULTY SEALS (%) |
|---|---|
| INVENTION | 0 |
| PRIOR ART | 4 |

B. Reliability Tests

The capacitor was tested for reliability by two tests, i.e., a high-temperature load test by applying the rated voltage to the capacitor continuously for 1000 hours in an environment of 125° C. and ordinary humidity, and a moisture resistance load-free test by allowing the capacitor to stand in an environment of 85° C. and RH 85% for 1000 hours without application of voltage. Ten specimens of each of the invention and prior-art capacitors were used for each test. The result of the high-temperature load test is given in Table 3, and that of the moisture resistance load-free test in Table 4.

TABLE 3

|  | BEFORE TEST CHARACTERISTICS VALUE | | | AFTER HIGH-TEMPERATURE LOAD TEST | | |
|---|---|---|---|---|---|---|
|  | tanδ (%) | ESR (mΩ) | ΔC/C (%) | tanδ (%) | ESR (mΩ) | LC FAULT RATIO (%) |
| INVENTION | 4.3 | 13 | −0.98 | 4.4 | 13 | 0 |
| PRIOR ART | 4.2 | 14 | −2.85 | 4.4 | 14 | 0 |

TABLE 4

|  | BEFORE TEST CHARACTERISTICS VALUE | | | AFTER MOISTURE RESISTANCE LOAD-FREE TEST | | |
|---|---|---|---|---|---|---|
|  | tanδ (%) | ESR (mΩ) | ΔC/C (%) | tanδ (%) | ESR (mΩ) | LC FAULT RATIO (%) |
| INVENTION | 4.2 | 13 | −0.30 | 4.3 | 14 | 0 |
| PRIOR ART | 4.2 | 14 | −1.85 | 4.3 | 15 | 0 |

With any of the invention and prior-art specimens listed in Tables 2 to 4, the capacitor element used was 4 V and 470 µF in ratings, 8 mm in outside diameter and 7 mm in length. Represented in Tables 3 and 4 by tan δ is the tangent of loss angle at 120 Hz, by ESR the equivalent series resistance at 100 kHz, and by Δ C/C the ratio of the variation of capacitance resulting from the test to the capacitance before the test. "LC fault ratio" means the relative number of specimens in which the leakage current was in excess of 376 µA when measured 120 seconds after the start of application of the rated voltage. Each of the characteristics values is the average for ten specimens.

Table 2 reveals that although several percent of faulty seals occurred in the prior-art specimens, no faulty seal occurred in the specimens of the invention.

Further Tables 3 and 4 indicate that the invention specimens were smaller than the prior-art specimens in variations of capacitance as determined by the reliability tests.

Although a TCNQ complex salt is used as the solid electrolyte in the foregoing embodiment, usable in place of the TCNQ complex salt are various solid electrolytes such as electrically conductive polymers including polypyrrole, polythiophene, polyfuran and polyaniline, $MnO_2$ and $PbO_2$.

The outer periphery of one of the pair of pipe members 73, 73 may be partially in contact with the inner periphery of the seal plate 71 defining the through hole 76.

The metal thin film 75 of the pipe member 73, which is intended to give improved bondability to the brazing metal material 33, need not always be formed over the entire surface of the pipe piece 74 but can be provided only over the inner periphery of the pipe piece 74 without being formed over the outer periphery thereof. In this case, the outer periphery of the pipe piece 74 may be partly in contact with the inner periphery of the seal plate 71 defining the through hole 76.

Figure 3:
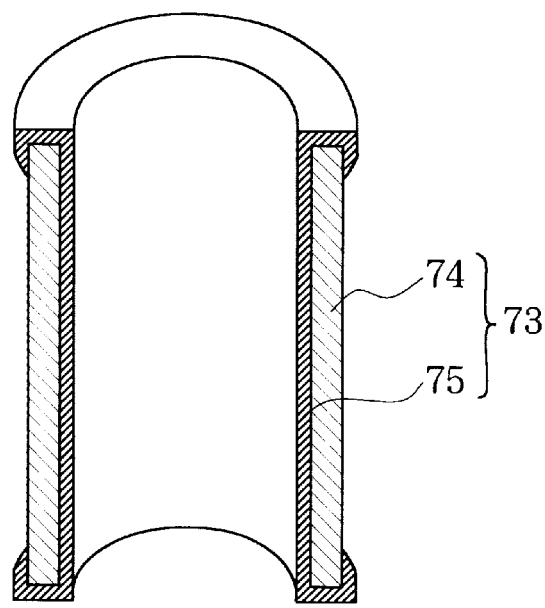
FIG. 3 is an enlarged view in section of a pipe member of different construction.
Figure 4:
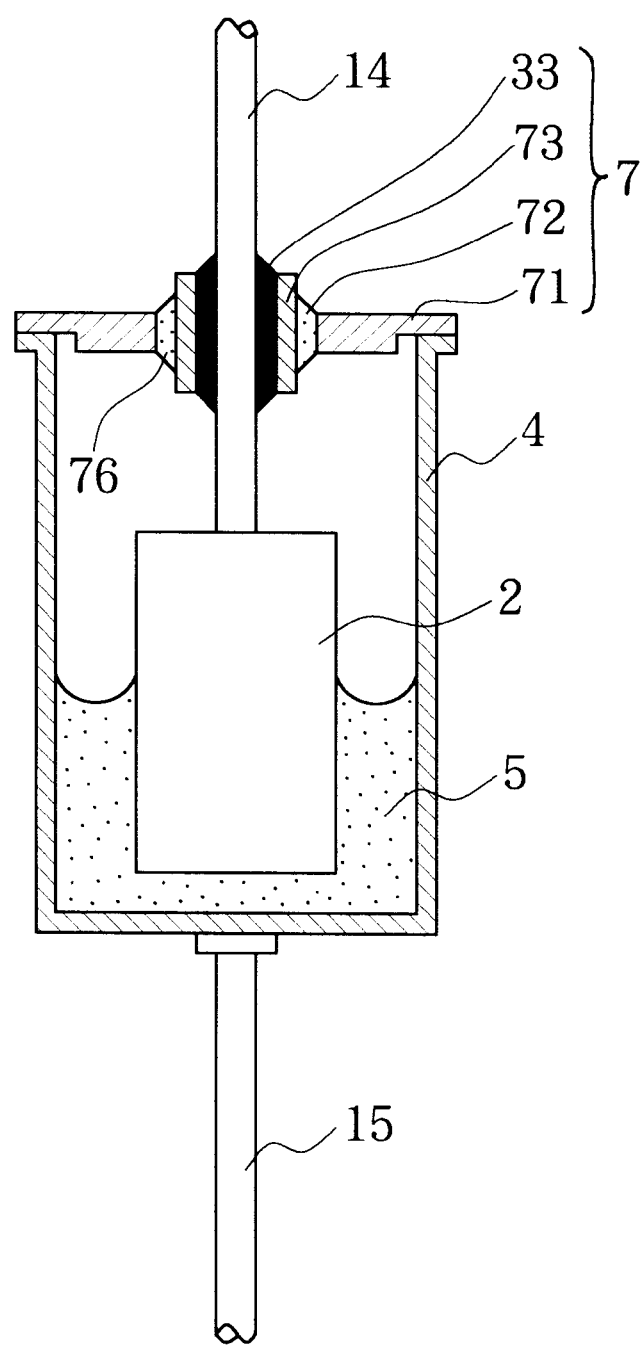
FIG. 4 is a view in section of another solid electrolytic capacitor embodying the invention.
Figure 5:
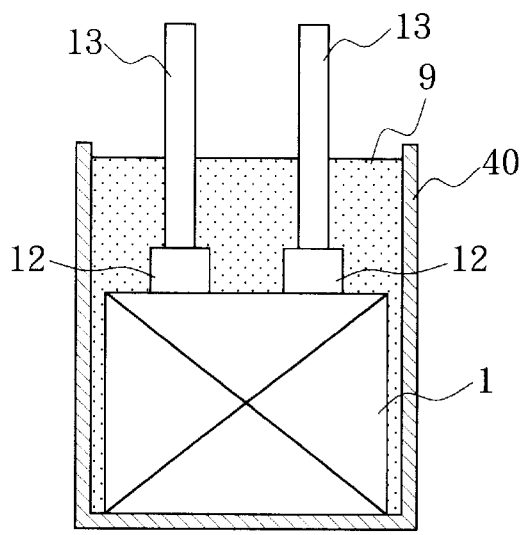
FIG. 5 is a view in section of a conventional solid electrolytic capacitor.

Further the present invention is not limited to solid electrolytic capacitors comprising a capacitor element 1 in the form of a roll but can be embodied as a solid electrolytic capacitor which comprises a capacitor element 2 prepared by forming a chemical conversion coating on a tantalum sintered body as shown in FIG. 4. The capacitor element 2 of this capacitor is impregnated with a solid electrolyte such as a conductive polymer, TCNQ complex salt or manganese dioxide, and is held in a case 4 with a solder, silver paste or like conductive material 5. An anode lead wire 14 extending from the capacitor element 2 extends through a pipe member 73 providing a hermetic seal structure 7, and a clearance in the pipe member 73 around the lead wire 14 is filled with a brazing metal material 33. The case 4 has a cathode lead wire 15 projecting therefrom. The pipe member 73 has the structure shown in FIG. 2 or 3.

The capacitor of the present invention is not limited to the foregoing embodiments in construction but can be modified variously by one skilled in the art without departing from the spirit of the invention as set forth in the appended claims.

What is claimed is:

1. A solid electrolytic capacitor comprising a tubular metal case having an opening at at least one end thereof, and a capacitor element enclosed in the case and having an anode member formed with a chemical conversion coating, the capacitor element being impregnated with a solid electrolyte and having at least one lead pin extending therefrom, the opening of the case being closed with a hermetic seal structure, the capacitor being characterized in that the hermetic seal structure comprises:

a metal seal plate having at least one through hole and provided on the case to close the opening thereof, the seal plate having an outer peripheral edge portion joined to an edge portion of the case defining the opening, a pipe member attached to the seal plate and inserted through the hole thereof, the pipe member having a center bore with the lead pin extending therethrough, a glass material filling a clearance in the through hole of the seal plate around the pipe member, and a brazing metal material filling a clearance in the pipe member around the lead pin, the pipe member comprising a ceramic pipe piece, and a metal thin film formed on the pipe piece at least at a portion thereof joined to the brazing metal material.

2. A solid electrolytic capacitor according to claim 1 wherein the metal thin film of the pipe member is formed over an entire surface of the pipe piece and is held out of contact with an inner periphery of the seal plate defining the hole.

3. A solid electrolytic capacitor according to claim 1 wherein the metal thin film of the pipe member is formed to cover only an inner periphery of the pipe piece.

4. A solid electrolytic capacitor according to claim 1 wherein the pipe piece and the metal thin film of the pipe member are each made from a nonmagnetic material.

5. A solid electrolytic capacitor according to claim 1 wherein the glass material contains PbO and $B_2O_3$, or Zn and $B_2O_3$, and the pipe piece contains alumina.

6. A solid electrolytic capacitor according to claim 1 wherein the solid electrolyte impregnating the capacitor element is a TCNQ complex salt, electrically conductive polymer, $MnO_2$ or $PbO_2$.

* * * * *